United States Patent [19]
Giles

[11] Patent Number: 6,045,022
[45] Date of Patent: Apr. 4, 2000

[54] FRONT MOUNTED BICYCLE CARRIER

[76] Inventor: Brian A. Giles, 22 Lamprey La., Durham, N.H. 03824

[21] Appl. No.: 09/228,693

[22] Filed: Jan. 12, 1999

[51] Int. Cl.[7] .................................. B60R 9/10; B60R 9/06
[52] U.S. Cl. .......................... 224/532; 224/488; 224/512; 224/513; 224/534; 224/924
[58] Field of Search .................................... 224/488, 492, 224/493, 511–516, 531, 532, 533, 534, 567, 568, 924

[56] References Cited

U.S. PATENT DOCUMENTS

| | | | |
|---|---|---|---|
| 2,432,732 | 12/1947 | Del Cano | 224/515 |
| 3,225,986 | 12/1965 | Anderson . | |
| 3,482,749 | 12/1969 | Cooper | 224/512 X |
| 3,670,935 | 6/1972 | Hinkston . | |
| 3,765,581 | 10/1973 | Kosecoff | 224/924 X |
| 3,841,544 | 10/1974 | Berger | 224/493 X |
| 3,891,132 | 6/1975 | Chandler . | |
| 3,901,421 | 8/1975 | Kalicki et al. . | |
| 3,923,221 | 12/1975 | Ballinger . | |
| 3,927,811 | 12/1975 | Nusbaum . | |
| 4,085,874 | 4/1978 | Graber . | |
| 4,290,540 | 9/1981 | Allen | 224/314 |
| 4,298,151 | 11/1981 | O'Connor | 224/513 X |
| 4,318,501 | 3/1982 | Graber . | |
| 4,411,461 | 10/1983 | Rosenberg | 224/513 X |
| 4,452,385 | 6/1984 | Prosen | 224/321 |
| 4,524,893 | 6/1985 | Cole | 224/319 |
| 4,676,413 | 6/1987 | Began et al. . | |
| 4,709,840 | 12/1987 | Allen | 224/314 |
| 4,856,686 | 8/1989 | Workentine . | |
| 4,863,080 | 9/1989 | Graber . | |
| 4,997,116 | 3/1991 | Grim . | |
| 5,056,700 | 10/1991 | Blackburn et al. | 224/324 |
| 5,065,921 | 11/1991 | Mobley | 224/324 |
| 5,118,018 | 6/1992 | Baldeck . | |
| 5,215,233 | 6/1993 | Baldeck . | |
| 5,228,606 | 7/1993 | Hickson . | |
| 5,230,449 | 7/1993 | Collis et al. . | |
| 5,244,133 | 9/1993 | Abbott et al. | 224/532 X |
| 5,373,978 | 12/1994 | Buttchen et al. | 224/532 X |
| 5,476,201 | 12/1995 | Hall et al. | 224/492 |
| 5,476,203 | 12/1995 | Fletcher | 224/536 |
| 5,526,971 | 6/1996 | Despain | 224/519 |
| 5,595,333 | 1/1997 | Boston | 224/488 X |
| 5,628,440 | 5/1997 | Gallazzini | 224/329 |
| 5,752,640 | 5/1998 | Proulx | 224/572 |
| 5,803,330 | 9/1998 | Stack et al. | 224/518 |
| 5,810,231 | 9/1998 | Kravitz | 224/532 |
| 5,820,002 | 10/1998 | Allen | 224/324 |

FOREIGN PATENT DOCUMENTS

| | | | |
|---|---|---|---|
| 2437323 A1 | 4/1980 | France | 224/513 |
| 3900569 A1 | 7/1990 | Germany | 224/511 |
| 2235909 | 3/1991 | United Kingdom | 224/924 |

*Primary Examiner*—Gregory M. Vidovich

[57] ABSTRACT

A carrier for transporting bicycles on the front of a motor vehicle allowing unrestricted access to vehicle trunk, rear cargo area, and top luggage rack. Carrier frame has a horizontal crossmember (10) and two vertical uprights (12). Two removable bicycle support arm assemblies (14) with safety tips extend forward from the crossmember (10). A protector sleeve (22) as part of arm assembly (14) protects bicycle finish at point of contact. An adaptable system comprised of elastic cord assemblies (42) and eyebolts (14, 16, & 18) secures bicycles to the carrier. Carrier mounts to vehicle at top surface of grill and front surface of bumper—four points, mirror image. Custom-designed mounting kits accommodate carrier to a multitude of vehicle makes and models while maintaining a low forward profile for Carrier and bicycle. Eyebolts (14, 16, and 18) serve as structural members, a system component for securing bicycles, attaching hardware, and a safety feature. An additional embodiment for frame-mounting of the Carrier is disclosed for vehicles where bumper-mounting is not practical.

13 Claims, 6 Drawing Sheets

FRONT MOUNTED BICYCLE CARRIER

BACKGROUND

1. Field of Invention

This invention relates to the transport of bicycles on motor vehicles, specifically to the mounting of a bicycle carrier on the front of a truck, van, or SUV (sport utility vehicle).

2. Description of Prior Art

Transportation planners increasingly emphasize the utility of a multi-modal transportation system that efficiently connects forms of human conveyance such as walking, bicycles, automobiles, buses, trains, and aircraft. One of the more popular connections in this system has been the bicycle and the motor vehicle. Many creative ideas have been advanced for mounting bicycles on vehicles such that they can be carried and used as an alternate form of transportation for work or recreation. These ideas, for the most part, specify devices for mounting bicycles in one of two locations: vehicle rear and vehicle roof Each of these locations poses a set of unique and significant problems.

Rear-Mounted Bicycle Carriers

Inventors have created a number of different concepts for carrying bicycles on the rear of vehicles. There are designs for carriers that attach to the rear trunk cover, hatchback, or tailgate (for example: U.S. Pat. No. 5,065,921 to Mobley, 1991; U.S. Pat. No. 4,290,540 to Allen, 1985; U.S. Pat. No. 5,056,700 to Blackburn and Lee, 1991; U.S. Pat. No. 4,085,874 to Graber, 1978; and U.S. Pat. No. 3,901,421 to Kalicki & Jalovec). There are designs that attach to the trunk and rear bumper (for example: U.S. Pat. No. 5,752,640 to Proulx, 1998; U.S. Pat. No. 5,628,440 to Gallazzini, 1997; U.S. Pat. No. 5,230,449 to Collis & Cass, 1993; U.S. Pat. No. 5,215,233 to Baldeck, 1993; U.S. Pat. No. 5,118,018 to Baldeck, 1992; U.S. Pat. No. 4,863,080 to Graber, 1989; U.S. Pat. No. 4,709,840 to Allen, 1985; U.S. Pat. No. 4,997,116 to Grim, 1991; U.S. Pat. No. 4,298,151 to O'Connor, 1981; U.S. Pat. No. 3,923,221 to Ballinger, 1975; and U.S. Pat. No. 3,927,811 to Nussbaum, 1975). There are designs that attach to the rear bumper (for example U.S. Pat. No. 5,810,231 to Kravitz, 1997, U.S. Pat. No. 4,318,501 to Graber, 1982; U.S. Pat. No. 3,891,132 to Chandler, 1973; U.S. Pat. No. 4,411,461 to Rosenburg, 1983; U.S. Pat. No. 3,841,544 to Berger, 1974; U.S. Pat. No. 2,432,732 to Del Cano, 1947; French Patent 2,437,323 to Hamel et al, 1978; U.S. Pat. No. 3,765,581 to Kosecoff, 1973; and U.S. Pat. No. 3,225,986 to Anderson, 1965). There are designs that attach to a trailer hitch (for example: U.S. Pat. No. 5,803,330 to Stack et al, 1998; U.S. Pat. No. 5,526,971 to Despain, 1996; U.S. Pat. No. 5,476,203 to Fletcher, 1975; U.S. Pat. No. 5,373,978 to Buttchen et al, 1994; U.S. Pat. No. 5,244,133 to Abbott et al, 1993; United Kingdom Patent 2,235,909 to Masurei 1991; German Patent DE 3,900,569 to Gaaloul, 1990; and U.S. Pat. No. 4,856,686 to Workentine, 1989. There are designs that attach to a rear mounted tire (for example: U.S. Pat. No. 5,228,606 to Hickson, 1991). And finally, there are designs that attach to vehicle frame and body (for example U.S. Pat. No. 4,676,413 to Began et al, 1987). All of these rear-mounted designs have one glaring problem in common—they impede or prevent entry to the trunk or rear cargo area of the vehicle. People are required to remove the bicycles from the carrier (and in many cases, the carrier from the vehicle) to access luggage, camping gear, recreational equipment, or other items stored in rear area of the vehicle. This disadvantage is particularly frustrating when bicycles are transported for extended camping or touring trips.

Further problems of convenience, complexity, and safety are evident for certain of the attachment concepts. Carriers that attach to the trunk cover require more than one person to lift a bicycle into place. Carriers that attach to trunk cover and rear bumper require, in many cases, an overly complex multiplicity of straps and pads for carrier mounting. Carriers that attach to a trailer hitch deny use of the hitch for its intended purpose and are relatively unstable because of single point mounting. In addition, trailer hitch carriers create a notable safety hazard because of their excessive rearward extension.

Roof-Mounted Bicycle Carriers

Many ideas have also been patented for carrying bicycles on the roof of a vehicle. Most of these devices include provisions for mounting a bicycle carrier on the roof drip molding or an existing roof rack (for example: U.S. Pat. No. 5,820,002 to Allen, 1998 and U.S. Pat. No. 4,524,893 to Cole, 1991). A variation of this idea includes mounting attachments on both roof and vehicle trunk (for example: U.S. Pat. No. 5,476,201 to Hall et al). Roof-mounted bicycle carriers pose two significant disadvantages. The first is accessibility. It is very cumbersome and difficult to lift, position, and secure a roof-mounted bicycle. The second is height. Bicycles carried in the upright position create a troublesome and possibly unsafe vehicle height extension. Both problems are particularly significant when bicycles are roof-mounted on normally high-standing trucks, vans and SUVs (sport utility vehicles).

Frame-Mounted Bicycle Carriers

Mounting of a bicycle carrier directly to the frame of a vehicle has likewise been considered in the art (for example: U.S. Patent to Began, 1987). Many bumpers on modern day vehicles do not provide a suitable mounting surface because they are constructed of molded polymers (plastics) for energy absorption in the event of a crash. Furthermore, many bumpers do not allow a means for attachment because of their integration into the body contours of the vehicle. This problem has been somewhat overcome with a vehicle that presents a trailer hitch or trailer hitch receiver. But, trailer hitch mounting is only available on the rear of a vehicle, and pose the rather significant disadvantages discussed above. Other attempts at frame-mounting (see above citation) limit application to vehicle rear and ignore the design challenges posed by these newer molded bumpers.

Bicycle Support Arms

Many of the inventions considered above specify extension members for supporting the bicycle. Extensions are called by various names including arm portions, horizontal members, otter holders, engaging arms, hanger rods, support arms, hanger assemblies, carrying members, brackets, etc. These extensions can pose a serious safety problem because of protruding sharp edges and tips. These members, when not in use, project from the rear of the vehicle in a menacing and dangerous fashion. Although some inventions (for example: U.S. Pat. No. 4,997,116 to Grim, 1991 and U.S. Pat. No. 4,856,686 to Workentine, 1989) allow provisions for rotating the bicycle support members out of harms way, most are permanently affixed with little concern for the hazard they present.

Front-Mounted Bicycle Carriers

The possibility of a front-mounted bicycle carrier is anticipated in patent art. Although most bicycle carrier inventions clearly specify mounting on either the rear or roof of a vehicle, some rear-mounted designs allow for possible adaptation to the front of a vehicle (for example: U.S. Pat. No. 5,752,640 to Proulx, 1998; U.S. Pat. No. 5,215,233 to Baldeck, 1993; U.S. Pat. No. 4,452,385 to Prosen, 1982;

U.S. Pat. No. 4,298,151 to O'connor, 1981; U.S. Pat. No. 3,923,221 to Ballinger, 1974, and U.S. Pat. No. 3,225,986 to Anderson, 1965). A review of these patents will confirm that these designs are clearly intended for rear-mounting only, and that any attempt to apply these systems to the front of a motor vehicle would prove impractical because of the methods for carrier mounting and obstruction to driver visibility. A further, but awkward, possibility is the combination of a spare tire mounting rack (see U.S. Pat. No. 3,482,749 to Cooper, 1968) and the tire-mounted bicycle carriers previously mentioned.

Securing the Bicycle

The patent art on vehicle mounted bicycle carriers discloses many methods for securing a bicycle to the carrier (see U.S. Patents referenced above). Methods involve a multiplicity of devices carrying such names as j-hooks, sliding frames, straps & buckles, bracket, channels, trays, yokes, troughs, simulated wheel axles, securing cables, clamping mechanisms, attaching devices, locking hasps, pivoting levers, etc. Some securing methods even require the disassembly of the bicycle. As a rule, these securing methods tend to be complex and expensive. A simple, versatile, and less expensive system is needed.

OBJECTS AND ADVANTAGES

Accordingly, several objects and advantages of my invention are:

(a) the bicycle carrier is specifically designed for mounting to the front of a motor vehicle allowing ready access to luggage, camping gear, and recreational equipment normally stored in the trunk or rear cargo areas of a vehicle;

(b) the carrier is positioned at a height that allows easy loading and unloading by one person;

(c) the carrier is simply, sturdy, and rigidly affixed to the vehicle;

(d) the carrier, both loaded and unloaded, presents a low forward profile and unrestricted driver visibility;

(e) the bicycle support arms have safety tips, and can be removed easily when not in use;

(f) bicycles are secured to the carrier by a simple and versatile system of elastic cords and eyebolts;

(g) eyebolts are used for a multiplicity of purposes including structural members, a system component for securing bicycles to the Carrier, attaching hardware, and a safety feature;

(h) Carrier can be mounted to a multiplicity of vehicle makes and models using custom-designed mounting hardware.

(i) Carrier is designed, but not limited to, use on trucks, vans, and SUVs (sports utility vehicles) that offer sufficient ground clearance and driver visibility; and (j) An additional embodiment allows for frame mounting to accommodate plastic-molded and body-contour bumpers found on many newer vehicles.

Further objects and advantages are that the bicycle carrier is easy to use because of its simple design, allows a viable alternate to existing rear-mounted and roof-mounted systems, is better appearing because of low profile, meets a need as yet unfulfiflled in the marketplace, and is a design who's utility that has been proven through extensive field testing. Further objects and advantages of my Bicycle Carrier will become apparent from a consideration of the drawings and ensuing description.

DESCRIPTION OF DRAWINGS

Drawings describing this invention contain the eight figures listed below. Some closely related drawings have the same number but different alphabetic suffixes.

REFERENCE NUMERALS IN THE DRAWINGS

10—crossmember
11—bicycle assembly
12—upright
14—bicycle support arm assembly
16—eyebolt, crossmember
18—eyebolt, bumper-mount
19—bumper assembly, vehicle
20—bracket, grill-mount
22—sleeve, protector
23—eyebolt, bicycle support arm
24—flange nut, bicycle support arm
25—lock nut, bicycle support arm
26—adapter, bumper-mount
27—spacer, bumper-mount
28—nut, bumper-mount
30—lock washer, bumper-mount
32—washer, bumper-mount
34—washer, grill-mount bracket
35—hood assembly, vehicle
36—lock washer, grill-mount bracket
37—grill assembly, vehicle
38—nut, grill-mount bracket
40—bolt, grill-mount bracket
42—elastic cord assembly
44—tube, frame-mount
45—alternate bumper assembly, vehicle
46—eyebolt, frame-mount
48—bolt, frame-mount
50—lock washer, frame-mount
51—spacer, frame-mount
52—washer, crossmember eyebolt
54—lock washer, crossmember eyebolt
56—nut, crossmember eyebolt
58—wrench, flange nut
60—frame assembly, vehicle

SUMMARY

The present invention describes a Front Mounted Bicycle Carrier. It is comprised of a horizontal crossmember, two uprights, two bicycle support arm assemblies, a system for securing the carrier to a multitude of vehicle makes and models, and a system for securing bicycles to the Carrier.

Description of the Invention—Preferred Embodiment

Figure 1:
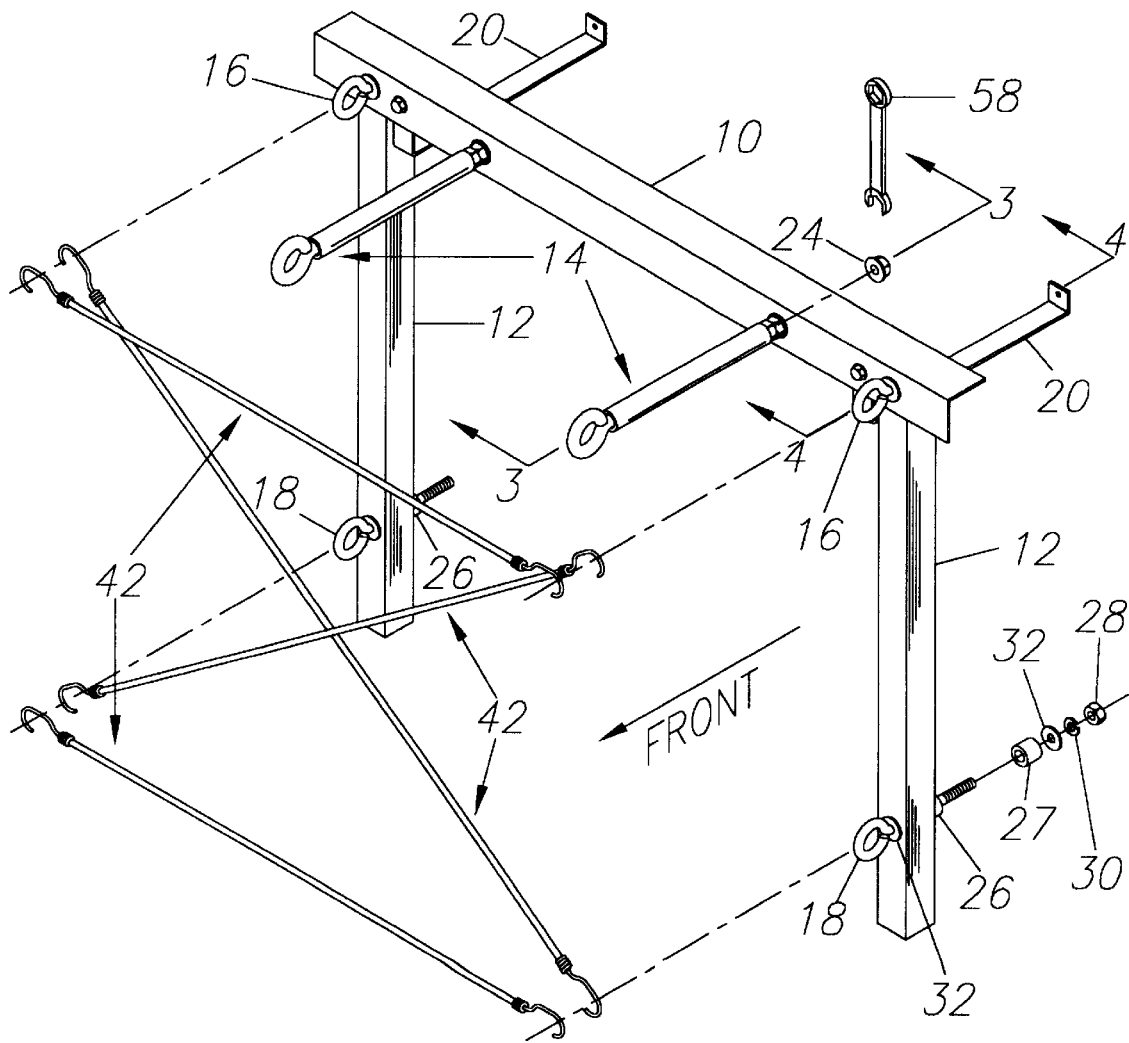
FIG. 1 is a perspective view showing all major components of the front mounted bicycle carrier (preferred embodiment).
Figure 2:
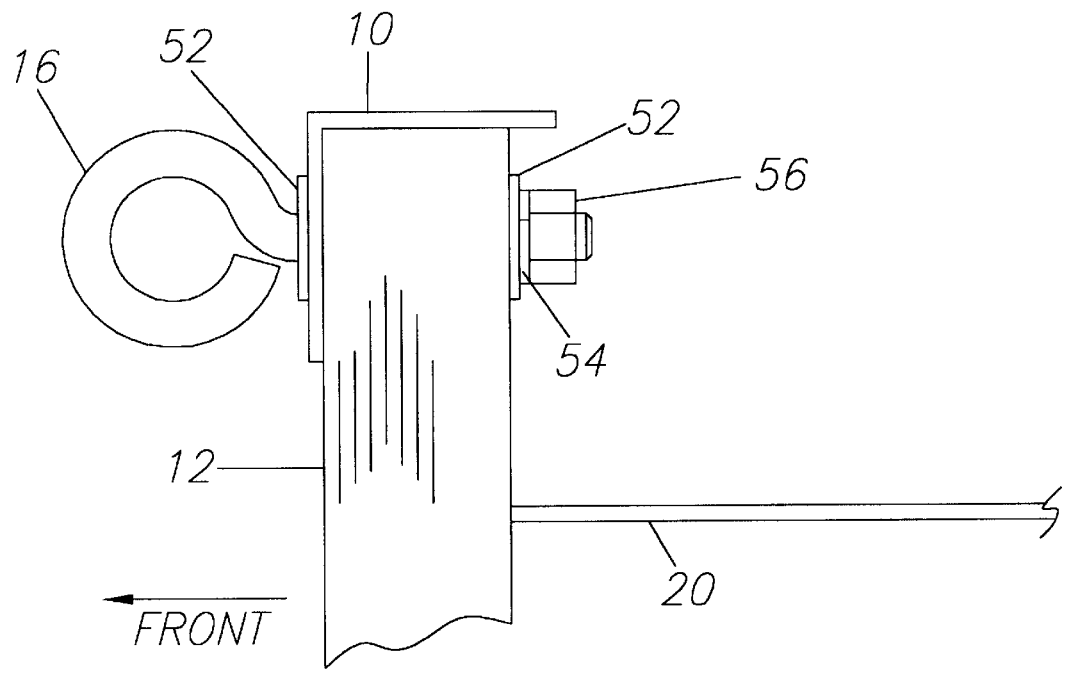
FIG. 2 is a side view that shows the components of the crossmember eyebolt system.

A typical embodiment of the Front Mounted Bicycle Carrier of the present invention is illustrated in FIG. 1 through 8. The Carrier has a horizontal crossmember 10 that is attached to two uprights 12 each equally spaced from a centerline. A crossmember eyebolt 16, two washers 52, a lock washer 54, and a nut 56 secure each upright 12. A side view of this attaching point is illustrated in FIG. 2. These elements constitute the basic Front Mounted Bicycle Carrier hereafter referred to as the "Carrier."

Figure 6:
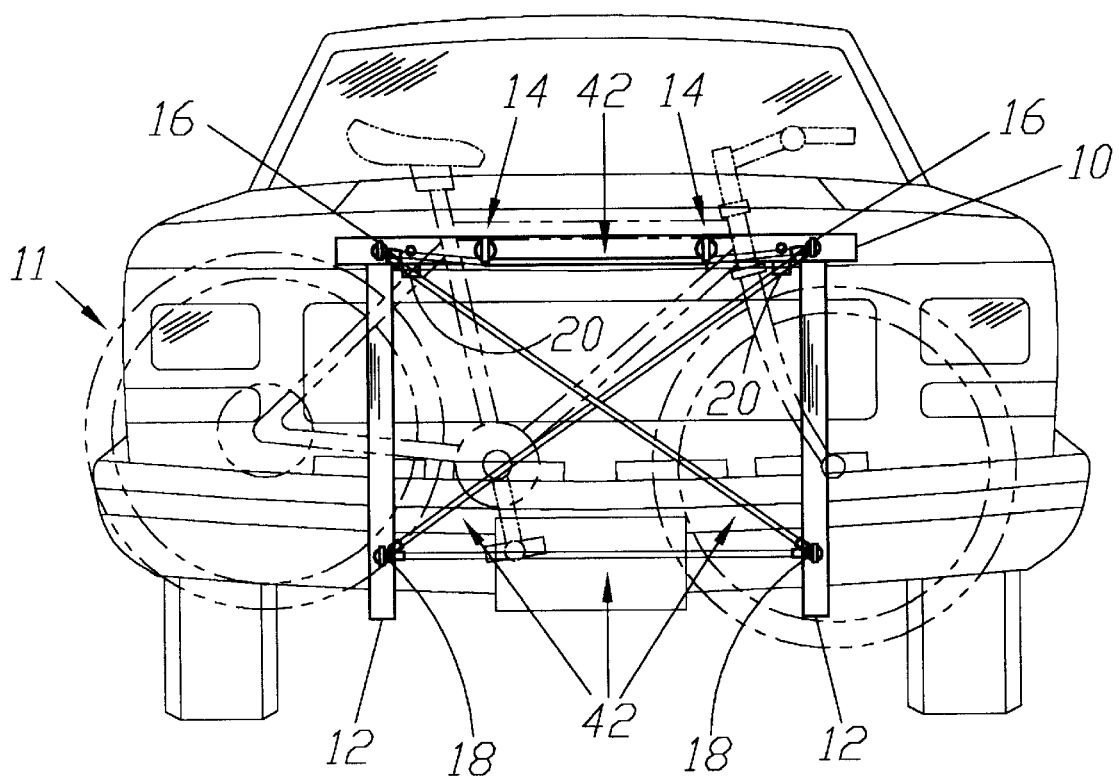
FIG. 6 is a front view of the bicycle carrier mounted on the front of a vehicle (preferred embodiment).
Figure 7:
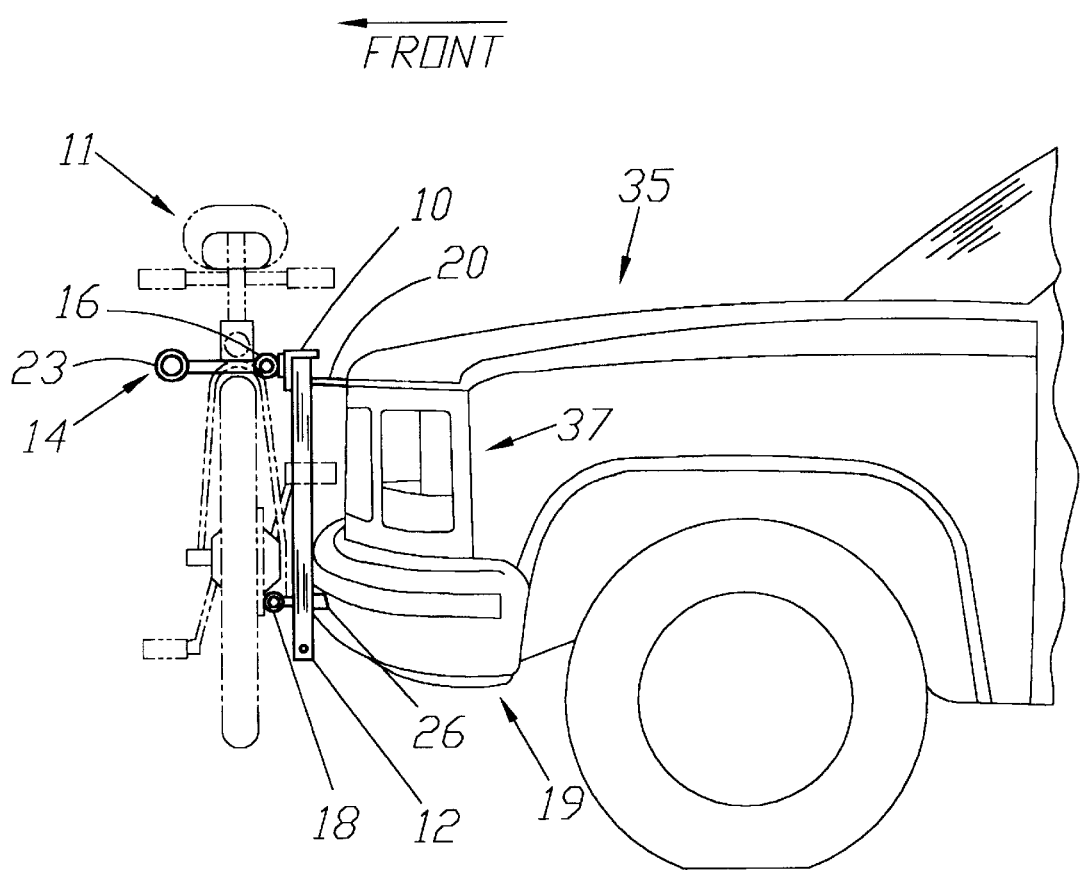
FIG. 7 is a side view of the bicycle carrier mounted on the front of a vehicle (preferred embodiment).

Two bicycle support arm assemblies 14 are secured to the Carrier in a front-oriented position by a flange nut 24. Arm assemblies 14 are equally spaced from Carrier centerline such that the total distance between is suitable for mounting a two-wheel bicycle in normal riding position (see FIGS. 6 and 7).

The Carrier is secured to front of the vehicle in a plane perpendicular to the ground. There are four points at which the Carrier is attached to a host vehicle—at the top through two grill-mount brackets 20 and at the bottom through two bumper-mount eyebolts 18. The right-hand and left-hand mounting points are mirror image.

Figure 4:
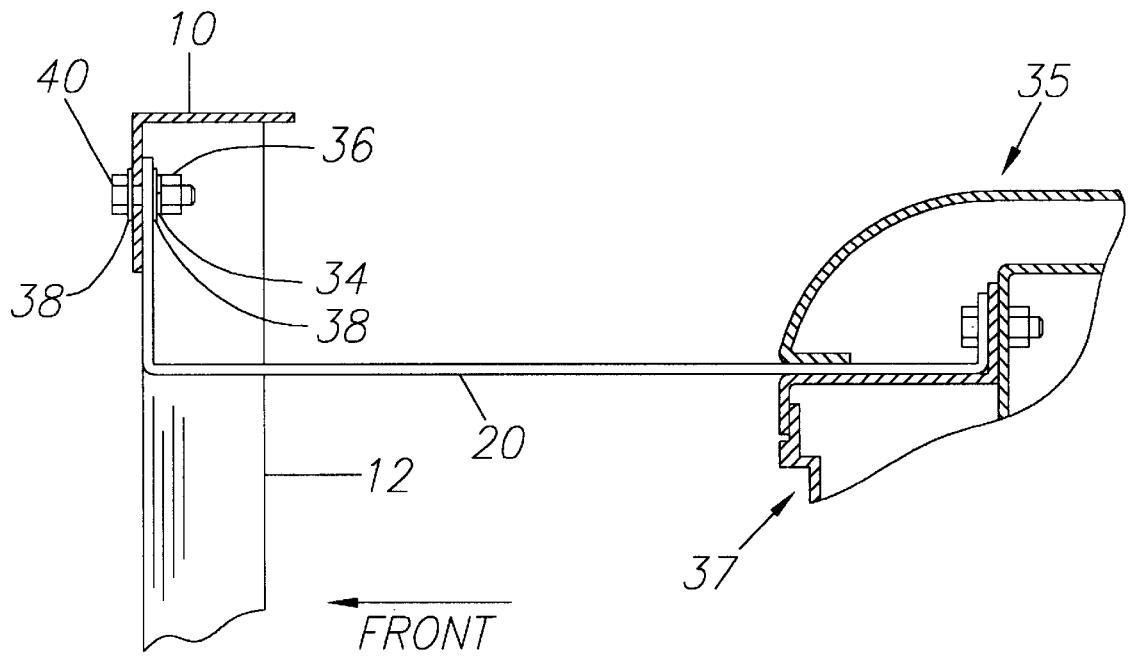
FIG. 4 is a sectional view that shows the components of the grill-mount bracket system.

The forward end of each bracket 20 is secured to the rear surface of crossmember 10 by a bolt 40, two washers 38, a lock washer 36, and a nut 34 (see FIG. 4). The rearward end of bracket 20 is uniquely shaped to fit a mounting point on the top surface of the grill assembly 37 of the host vehicle and secured by suitable hardware. Bracket 20 enters the space between the upper surface of grill 37 and the lower surface of the hood assembly 35 of the host vehicle such to not restrict operation of hood assembly 35. A preferred attachment uses bolt locations and attaching hardware existing on the host vehicle.

Figure 5:
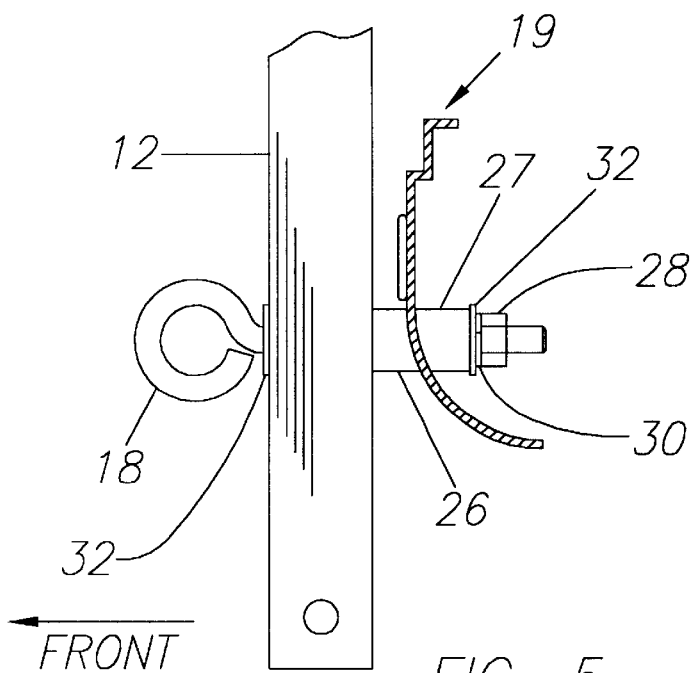
FIG. 5 is a side view that shows the components of the bumper-mount eyebolt system

Bumper-mount eyebolt 18 passes through a washer 32, the forward surface of upright 12, a bumper-mount adapter 26, and a hole drilled in the bumper assembly 19 of the host vehicle. Eyebolt 18 is then secured at the rearward surface of bumper 19 by a spacer 27, a washer 32, a lock washer 30, and a nut 28 (See FIG. 5). Adapter 26 and spacer 27 are uniquely shaped to fit the contour of bumper 19. In the preferred embodiment, bracket 20 and adapter 26 establish suitable clearance between upright 12 and bumper 19 of host vehicle.

Figure 3:
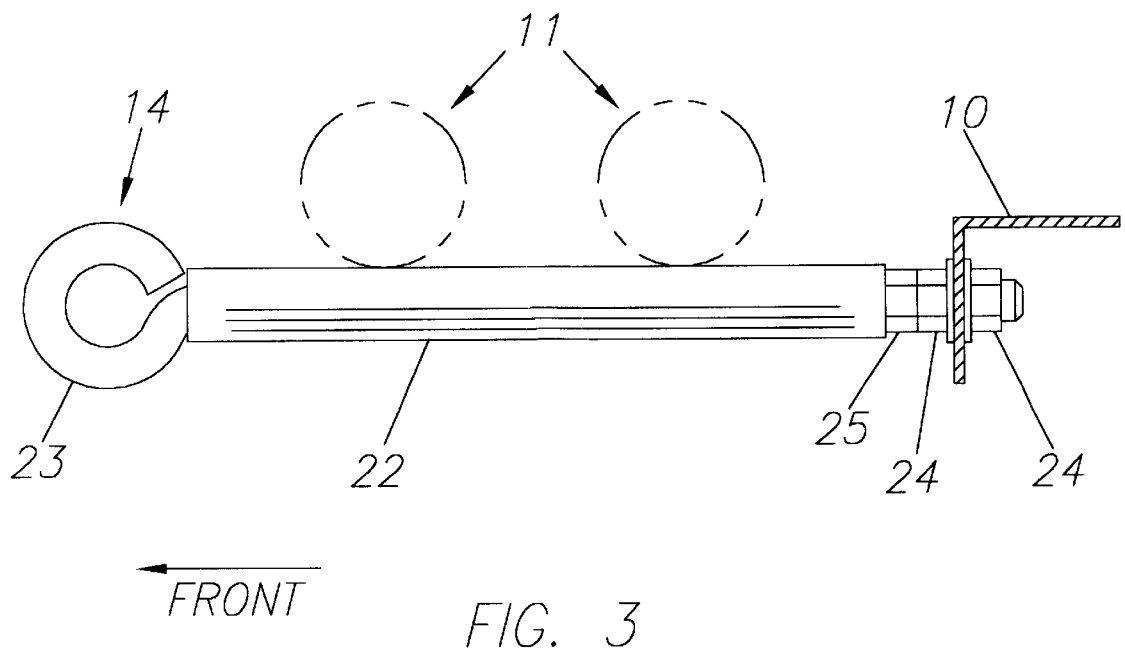
FIG. 3 is a sectional view that shows the components of the bike support arm system.

A detailed configuration of bicycle support arm assembly 14 is illustrated in FIG. 3. Holes, equally spaced from the centerline of crossmember 10, provide mounting locations on the forward surface of the Carrier for two arm assemblies 14. At the center of each arm assembly 14 is an eyebolt 23 of a material and length suitable for supporting at least two fill-sized bicycles positioned on the front surface of the Carrier. A protector sleeve 22 of a material suitable for preventing scratches to the surface finishes of bicycle crossmembers, a lock nut 25, and two flange nuts 24 complete arm assembly 14. Lock nut 25 and flange nut 24 secure sleeve protector 22 onto eyebolt 23 with the wider surface of the flange nut serving as a mounting surface to crossmember 10. The other flange nut 24 is used to conveniently secure arm assembly 14 to the Carrier when in use, and to remove arm assembly 14 when bicycles are not being transported.

The final two components of the preferred embodiment are the flange nut wrench 58 and four elastic cord assemblies 42 (see FIG. 1). Wrench 58 is a freestanding tool for securing and removal of arm assembly 14, and cord assemblies 42 are freestanding items for securing bicycle(s) 11 to the Carrier.

The materials and finishes used in components specified for this invention shall be corrosion and chip resistant. Crossmember 10, uprights 12, brackets 20, adapters 26, and spacers 22, are manufactured from steel (or aluminum) with powder metal finish. Off-the-shelf hardware (eyebolts, hex bolts, washers, lock washers, and nuts) are manufactured from stainless steel. Other special materials are specified in the above description.

Operation—Preferred Embodiment

This invention allows the mounting and transport of at least two bicycles on the front of a vehicle. The attachment of the Carrier to the vehicle is simple, sturdy, and compact. The mounting of the bicycle to the Carrier is convenient and quick. Provisions are made for the removal of bicycle support arm assemblies 14 when the Carrier is not in use. All components of the Carrier are corrosion and chip resistant. This invention is designed, but not limited, for use on trucks, vans, and SUVs (sports utility vehicles) that provide sufficient ground clearance and forward driver visibility. A system is provided for adapting the Front Mount Bicycle Carrier to a multitude of makes and model of motor vehicles.

Crossmember 10 and two uprights 12 comprise the basic frame of the Carrier. Attached to this frame are two bicycle support arm assemblies 14, two crossmember eyebols 16, and two bumper-mount eyebolts 18. Bicycle(s) 11 rest at the crossbar on arm assemblies 14 and are secured to the Carrier by a multitude of elastic cord assemblies 42 that hook into the eyebolts 16, 18, & 23 (see FIGS. 1, 6, and 7). The Carrier height (distance from the ground) and the system for mounting, securing, and removal allow easy loading and unloading of bicycles by one person. The protector sleeves 22 on arm assemblies 14 prevent damage to crossbars of mounted bicycle(s) 11. Bicycle(s) 11 can be locked to the Carrier using any of a number of standard bicycle security devices.

When bicycles are not being transported, arm assemblies 14 are easily removed from the carrier and stored by removing flange nuts 24 with wrench 58. Also, when bicycles are not being transported cord assemblies 42 may be stored by hooking both ends through eyebolts 16 and 18 in any desired configuration. Both loaded and unloaded, the Carrier presents a low forward profile, sufficient ground clearance, and unrestricted driver visibility for the host vehicle.

Eyebolts 23, 16, & 18 serve a combination of special purposes. Eyebolt 16 serves to attach crossmember 10 to uprights 12 (see FIG. 2). Eyebolt 18 serves in part to attach the Carrier at its lower end to the vehicle bumper (see FIG. 4). Eyebolt 23 serves as a structural member and attaching member for the arm assemblies 14 (see FIG. 3). In addition, eyebolt 23 prevents mounted bicycles from sliding forward on arm assembly 14 during forward vehicle braking (see FIG. 7). All eyebolts are a safety feature in that they limit the number of front-protruding sharp surfaces and edges presented by the Carrier (see FIG. 7).

The Carrier is specifically designed for mounting to the front of vehicles such as trucks, vans, or SUVs (sports utility vehicle) with adequate ground clearance and driver visibility. This forward location provides easy placement and removal of bicycles from the vehicle and unrestricted access to both rear cargo area and roof luggage racks. The Carrier is exceptionally sturdy because of its construction, materials, and mounting methods. This sturdiness is essential for extended touring or off-road driving. Many drivers prefer to leave a bicycle carrier permanently affixed to their vehicle. Rear-mounted and roof-mounted carriers continue to restrict access or deny use of these locations for other purposes when the carrier is left in place. A front-mounted carrier offers no such disadvantage.

The mounting height and forward spacing of the Carrier are predetermined for each host vehicle. At the top, bracket 20 attaches the Carrier to the vehicle such that transported bicycles 11 have adequate ground clearance and crossmember 10 has a minimum height above the leading edge of the hood (see FIGS. 6 & 7). This is accomplished through custom-design of bracket 20. The forward end of bracket 20 mounts to the rear surface of crossmember 10 and is secured by attaching hardware 34, 36, 38, & 40 (see FIG. 4). Bracket 20 then passes between the top surface of host vehicle grill 37 and the underside of hood 35 and is positioned such as to not restrict movement and operation of the hood (see FIGS. 4 and 7). The preferred design uses mounting points and hardware existing on grill 37 of host vehicle. Drilled holes and appropriate mounting hardware constitute an alternate design. Carrier shall be marketed with a selection of grill-mount brackets 20 that are custom-designed for a multitude of vehicle makes and models.

The Carrier is mounted at bumper assembly 19 so as to maintain the forward vertical spacing established by bracket 20 and accommodate the unique shape of various bumper profiles. The preferred embodiment mounts to bumper 19 using bumper-mount eyebolt 18 that passes through upright 12, bumper-mount adopter 26 (front surface of bumper), a drilled hole in bumper 19, bumper-mount spacer 27 (rearward surface of bumper), and securing hardware 28, 30, and 32 (see FIG. 5). Adapter 26 provides adequate clearance between the Carrier and bumper molding, and mates securely to any unique bumper profile (see FIGS. 5 & 7). Right-hand and left-hand bumper mountings are mirror image.

To accommodate the multitude of vehicle makes and models, a number of adapter kits are fabricated. Each kit contains a set of grill-mount brackets 20, attaching hardware 34, 36, 38, and 40, bumper-mount eyebolts 18, bumper-mount adapters 26, bumper-mount spacers 27, and attaching hardware 28, 30, and 32. This kit is custom-designed for each unique vehicle application.

Additional Embodiment

An additional embodiment provides for frame-mounting of Carrier to a host vehicle rather than bumper-mounting. Many modern vehicles do not provide a suitable mounting surface for the Carrier at the bumper level because of special materials (for example: impact resistant polymer filled with energy absorbing foam) and styling trends (for example: bumper contours blended tightly to the vehicles outer surface). The additional embodiment overcomes these constraints by offering an alternate system for Carrier mounting.

Description—Additional Embodiment

The additional embodiment includes all parts described under the preferred embodiment with the exception of eyebolt 18, adapter 26, spacer 27, and attaching hardware 28, 30, and 32.

Figure 8A:
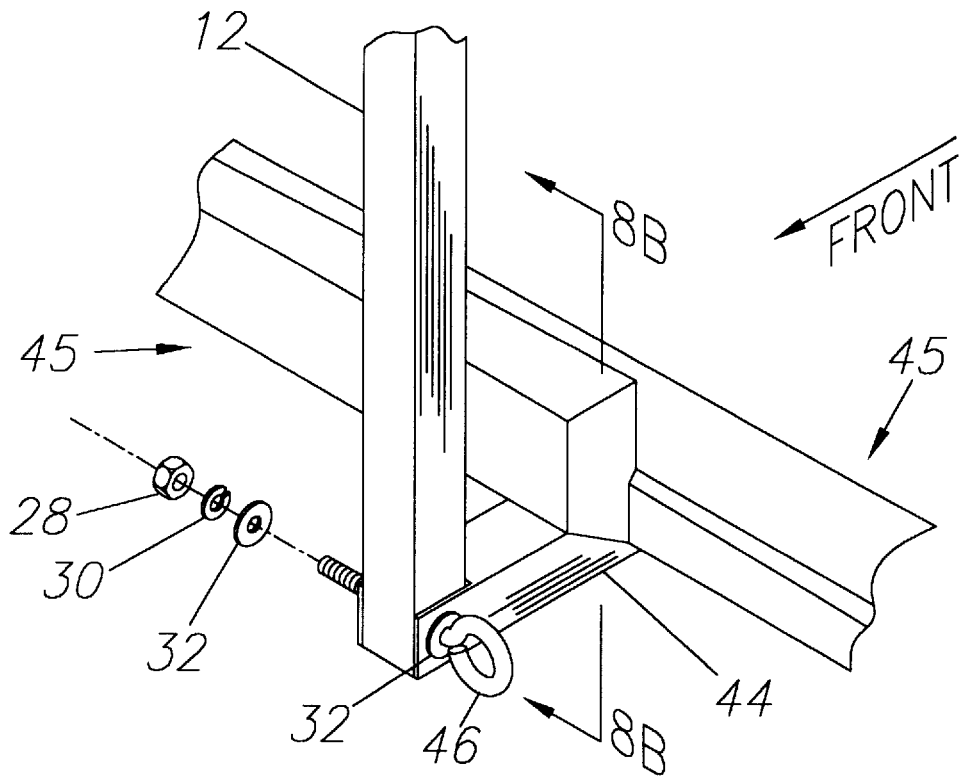
FIG. 8a is a perspective view of the bicycle carrier showing the frame-mount eyebolt system (additional embodiment).
Figure 8B:
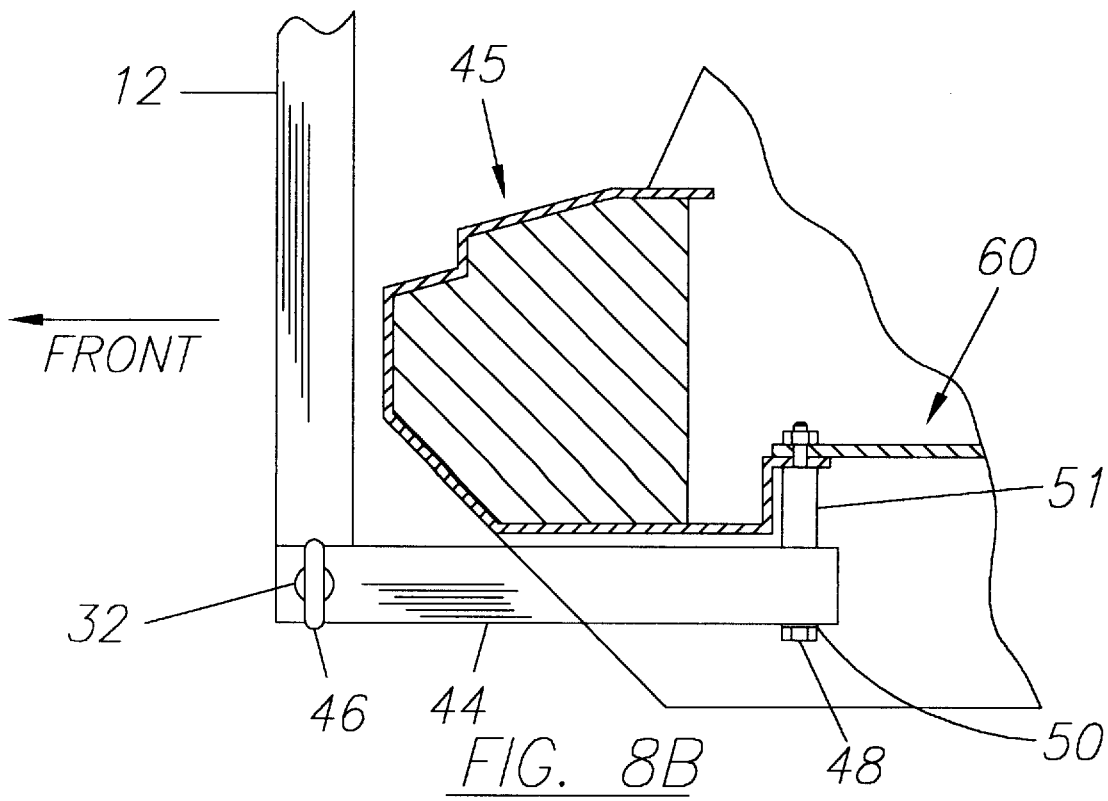
FIG. 8b is a sectional view of the frame-mount eyebolt system (alternate embodiment).

New parts for the additional embodiment include a frame-mount tube 44 that attaches on the forward end to upright 12 and on the rearward end to the vehicle frame assembly 60. With this arrangement, the Carrier avoids any contact with the bumper (see FIGS. 8a and 8b). On the forward end, tube 44 is notched to mate with the lower end of upright 12. Attaching hardware at this point includes a frame-mount eyebolt 46, two washers 32, lock washer 30, and nut 28. On the rearward end, tube 44 is secured to the vehicle frame assembly 60 by a frame-mount bolt 48, a lock washer 50, and a frame-mount spacer 51. The length of tube 44, the size and length of bolt 48, and the length of spacer 50 are custom-designed for individual makes and models of host vehicle such to provide suitable bumper clearance and secure mounting of the Carrier (see FIG. 8b).

Operation—Additional Embodiment

The operation of the Carrier is identical in all ways to the preferred embodiment with the exception that frame-mounting is substituted for bumper-mounting at the lower end. The additional embodiment is attached to the vehicle at four points: two at surface of grill 37 and two at the vehicle frame 60. The right-hand and left-hand sides are mirror images. At the top, the Carrier attachment is identical to the preferred embodiment setting the height and forward profile of the Carrier on the vehicle through bracket 20. At the bottom, frame-mounting maintains this height and profiles on vehicles where bumper-mounting is not practical.

Frame-mounting of the Carrier is as follows. At the Carrier bottom, tube 44 extends in a horizontal plane under bumper 45 from upright 12 to an attaching point on frame 60. Spacer 51 allows tube 44 to remain in this horizontal plane while attaching securely to the vehicle frame 60. (see FIGS. 8a and 8b). Preferred design uses mounting points and hardware existing on frame 60 of host vehicle secured by the bolt 48 and lock washer 50. Drilled holes and additional mounting hardware constitute an alternate design.

Frame-mount eyebolt 46 also serves as an attaching point for cord assemblies 42 that secure bicycle(s) 11 to the Carrier.

The Carrier is adapted to a multitude of vehicle brands and models with specialized mounting kits. For the additional embodiment, the mounting kit contains a set of grill mounting brackets 20, attaching hardware 34, 36, 38, and 40, frame-mount tubes 44, frame-mount spacers 51, frame mount bolts 48, frame mount eyebols 46, and other attaching hardware 28, 30, 32, and 50. This kit is custom-designed for each unique vehicle application.

Conclusions, Ramifications, and Scope

Accordingly the reader will see that the Front Mounted Bicycle Carrier of the invention provides a simple, sturdy, convenient, and easy-to-use device for the transport of at least two bicycles on a motor vehicle. The primary advantage is that the Carrier is mounted to front of the vehicle allowing ready access to the rear trunk, rear cargo area, or rooftop rack. Furthermore, the Front Mounted Bicycle Carrier has added advantages in that:

it can be readily mounted to many different makes and models of vehicles using custom-designed adapter kits;

it is positioned at a height that allows easy access and loading by one person;

it is simple in design, sturdy in structure, and rigidly affixed to the vehicle;

it presents a low forward profile, both loaded and unloaded;

it has bicycle support arm assemblies that are easily removed when not in use;

it uses eyebolts for a multiple number of purposes including structural members, a system component for securing bicycles to Carrier, attaching hardware, and a safety feature;

it is constructed of materials and finishes that are chip-proof and corrosion resistant;

it secures bicycles to the Carrier with a simple and versatile system of elastic cords and eyebolts; and it allows an additional embodiment for frame mounting to accommodate the plastic molded and/or body contour bumpers found on many newer vehicles.

Although the description above contains much specificity, this should not be construed as limiting the scope of the invention, but as merely providing illustrations of some of the presently preferred embodiments of this invention. Many other variations are possible. Examples follow. Crossmember 10 and uprights 12 can be made from different structural shapes (round tubing, channels, flat stock, etc.), or combined as a single unit casting. The Carrier can be attached at other mounting points and surfaces on the front of the vehicle. A general purpose mounting kit, which provides sufficient materials and hardware for customer-fabricated mounting, can be provided. Components and attaching hardware can be manufactured from different materials and finishes. An alternate system for securing bicycles to the carrier can be substituted for elastic cord assemblies and eyebolts. A different method for securing and removal of the bicycle support arm assemblies can be devised. The invention can be adapted for mounting to vehicles other than trucks, vans, and SUVs.

Accordingly, the scope of the invention should be determined determined not by the embodiments illustrated, but by the appended claims and their legal equivalents.

I claim:

1. A carrier for the transport of a bicycles on the front of motor vehicle, comprising:
   (a) a rigid horizontal crossmember of predetermined length and cross-section, said crossmember having a forward and a rearward surface,
   (b) a plurality of vertical uprights of substantially equal strength, each having a means to attach to said horizontal crossmember at spaced locations on said rearward surface,
   (c) a plurality of removable bicycle-support arms such that said arms (1) protrude forward of said motor vehicle in a horizontal plane, (2) have a means to dispose, secure, and remove to said crossmember on said forward facing surface, and (3) are of predetermined length and cross-section to support at least two bicycles,
   (d) a plurality of elastic cords and a bicycle-securing means such that at least two bicycles are conveniently disposed, secured, and removed to said carrier,
   (e) a plurality of grill-mounting brackets that are disposed to said crossmember at said rearward surface and a vehicle-mounting means such that said carrier is adapted to be disposed to the grill and front bumper of the vehicle,
      whereby front-mounting of said carrier provides unrestricted access to a rear trunk, a rear cargo area, and a roof rack of said motor vehicle,
      whereby said carrier presents a low and safe forward profile and unrestricted forward visibility to a driver of said vehicle,
      whereby at least two bicycles are conveniently and easily disposable, securable, and removable to said carrier, and
      whereby said carrier is readily mountable a multitude of vehicle makes and models.

2. The carrier of claim 1, further including eyebolts as a component of (1) said bicycle-support arms, (2) said means for attaching said vertical uprights to said crossmember, and (3) said vehicle-mounting means for disposing said carrier to the front bumper of said motor vehicle, whereby the eye of said eyebolts provides attaching points for said plurality of elastic cords.

3. The carrier of claim 2, further including a protector sleeve surrounding each of said bicycle-support arms such that to provide a means of protection between said support arms and the mounted bicycles.

4. The carrier of claim 3, further including a lock nut and flange nut disposed to each of said removable bicycle-support arms such that to secure an associated said protector sleeve onto said bicycle-support arm.

5. The carrier of claim 4, further including an additional flange nut disposed to each of said bicycle-support arms such that to serve as a component of said means to dispose, secure, and remove said bicycle-support arms to said horizontal crossmember.

6. The carrier of claim 5, further including hooks respectively disposed at both ends of said elastic cords (1) as a component of the bicycle-securing means and (2) as a device for disposing said elastic cords to the plurality of said eyebolts.

7. The carrier of claim 1, wherein said rigid horizontal crossmember is manufactured from angle stock.

8. The carrier of claim 1, wherein said vertical uprights are manufactured from square tubing.

9. The carrier of claim 1, wherein said plurality of grill-mounting brackets are custom-designed in a predetermined configuration for each of said multitude of vehicle makes and models such that to (1) set the height and forward spacing of said carrier relative to said motor vehicle and (2) allow unrestricted movement of the hood of said vehicle.

10. The carrier of claim 9, further including a plurality of bumper-mount adapters and bumper-mount spacers that are a component of said vehicle-mounting means and are custom-designed in a predetermined configuration for each of said multitude of vehicle makes and models such that to (1) securely sandwich the front bumpers of said motor vehicle and (2) maintain the forward spacing of said carrier relative to said motor vehicle.

11. The carrier of claim 9, further including a plurality of horizontal frame-mount members that are a component of said vehicle-mounting means and are custom-designed in a predetermined configuration for each of a multitude of motor vehicles with plastic molded or body contoured front bumpers such that to dispose said carrier to the frame of said motor vehicle.

12. The carrier of claim 11 whereby said frame-mount members are manufactured from square tubing such that the external walls of said vertical uprights will respectively nest within internal walls of said horizontal frame-mount members.

13. The carrier of claim 12, further including a plurality of frame-mount spacers that are a component of said vehicle-mounting means and are custom designed in a predetermined configuration for each of said multitude of motor vehicles with plastic molded or body contoured front bumpers such that to work in conjunction with said frame-mount members to maintain the forward spacing and front bumper clearance of said carrier relative to said motor vehicles.

* * * * *

UNITED STATES PATENT AND TRADEMARK OFFICE
CERTIFICATE OF CORRECTION

PATENT NO. : 6,045,022
DATED : April 4, 2000
INVENTOR(S) : Brian A. Giles

It is certified that error appears in the above-indentified patent and that said Letters Patent is hereby corrected as shown below:

Column 1, line 20, after "roof" insert --.--;

Column 2.line 49, change "otter" to --outer--;
Column 3, line 58, change "unfulfiflled" to --unfulfilled;

Column 6, line 22, change "eyebols" to --eyebolts--;
Column 6, line 37, after "transported" insert --,--;

Column 8, line 32, change "eyebols" to --eyebolts--;
Column 9, line 21, after "determined" delete --determined--;
Column 9, line 58, after "mountable" add --to--; and
Column 10, line 47, change "vehicle" to -- vehicles--.

Signed and Sealed this

Twenty-seventh Day of March, 2001

Attest:

NICHOLAS P. GODICI

Attesting Officer

*Acting Director of the United States Patent and Trademark Office*